United States Patent
Szmigiel et al.

(10) Patent No.: US 11,449,308 B2
(45) Date of Patent: Sep. 20, 2022

(54) CONDENSED SPOKEN UTTERANCES FOR AUTOMATED ASSISTANT CONTROL OF AN INTRICATE APPLICATION GUI

(71) Applicant: Google LLC, Mountain View, CA (US)

(72) Inventors: Jacek Szmigiel, Zurich (CH); Joseph Lange, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 6 days.

(21) Appl. No.: 16/972,987

(22) PCT Filed: Aug. 12, 2019

(86) PCT No.: PCT/US2019/046145
§ 371 (c)(1),
(2) Date: Dec. 7, 2020

(87) PCT Pub. No.: WO2021/015801
PCT Pub. Date: Jan. 28, 2021

(65) Prior Publication Data
US 2021/0182018 A1 Jun. 17, 2021

Related U.S. Application Data

(60) Provisional application No. 62/876,323, filed on Jul. 19, 2019.

(51) Int. Cl.
*G06F 3/16* (2006.01)
*G06F 3/0482* (2013.01)
(Continued)

(52) U.S. Cl.
CPC ............ *G06F 3/167* (2013.01); *G06F 3/0482* (2013.01); *G06F 3/04847* (2013.01);
(Continued)

(58) Field of Classification Search
CPC ............... G06F 3/0482; G06F 3/04883; G06F 3/04847; G06F 3/167; G10L 15/22; G10L 2015/223
See application file for complete search history.

(56) References Cited

U.S. PATENT DOCUMENTS 8,560,324 B2 * 10/2013 Shin ........................ G06F 3/167
704/275
10,847,149 B1 * 11/2020 Mok ........................ G10L 15/08
(Continued)

OTHER PUBLICATIONS

Harrison, Stephen, "Don't call it 'SIRI': Why the wake word should be 'computer,'" retrieved from https://www.salon.com/2017/11/26/dont-call-it-siri-why-the-wake-word-should-be-computer/ on Oct. 1, 2021 (reader mode), published on Nov. 26, 2017 (5 pages). (Year: 2017).*

(Continued)

*Primary Examiner* — Eric J. Bycer
(74) *Attorney, Agent, or Firm* — Middleton Reutlinger

(57) ABSTRACT

Implementations set forth herein relate to an automated assistant that can control graphical user interface (GUI) elements via voice input using natural language understanding of GUI content in order to resolve ambiguity and allow for condensed GUI voice input requests. When a user is accessing an application that is rendering various GUI elements at a display interface, the automated assistant can operate to process actionable data corresponding to the GUI elements. The actionable data can be processed in order to determine a correspondence between GUI voice input requests to the automated assistant and at least one of the GUI elements rendered at the display interface. When a particular spoken utterance from the user is determined to correspond to multiple GUI elements, an indication of (Continued)

ambiguity can be rendered at the display interface in order to encourage the user to provide a more specific spoken utterance.

20 Claims, 7 Drawing Sheets

(51) Int. Cl.
   *G06F 3/04847* (2022.01)
   *G06F 3/04883* (2022.01)
   *G10L 15/22* (2006.01)

(52) U.S. Cl.
   CPC .......... *G06F 3/04883* (2013.01); *G10L 15/22* (2013.01); *G10L 2015/223* (2013.01)

(56) References Cited

U.S. PATENT DOCUMENTS

| | | | | |
|---|---|---|---|---|
| 2006/0136221 | A1* | 6/2006 | James | G10L 15/26 704/275 |
| 2012/0016678 | A1* | 1/2012 | Gruber | G06F 16/9537 704/275 |
| 2012/0173244 | A1* | 7/2012 | Kwak | G10L 15/22 704/275 |
| 2012/0265528 | A1* | 10/2012 | Gruber | G10L 15/183 704/235 |
| 2014/0214429 | A1* | 7/2014 | Pantel | G10L 15/22 704/275 |
| 2014/0222436 | A1* | 8/2014 | Binder | G10L 15/26 704/275 |
| 2014/0278413 | A1* | 9/2014 | Pitschel | G10L 15/22 704/243 |
| 2014/0282003 | A1* | 9/2014 | Gruber | G06F 3/167 715/727 |
| 2015/0348551 | A1* | 12/2015 | Gruber | H04M 3/4936 704/235 |
| 2016/0328205 | A1* | 11/2016 | Agrawal | H04M 1/72403 |
| 2016/0351190 | A1* | 12/2016 | Piernot | G10L 15/22 |
| 2017/0084274 | A1* | 3/2017 | Kim | G10L 15/02 |
| 2017/0169817 | A1* | 6/2017 | VanBlon | G10L 15/22 |
| 2017/0358305 | A1* | 12/2017 | Kudurshian | G06F 3/167 |
| 2018/0061420 | A1* | 3/2018 | Patil | G06F 3/0482 |
| 2018/0182390 | A1* | 6/2018 | Hughes | G10L 15/08 |
| 2019/0102203 | A1 | 4/2019 | Wang et al. | |
| 2019/0213999 | A1* | 7/2019 | Grupen | H04M 3/4936 |

OTHER PUBLICATIONS

Trollope, Rowan, "7 Things You Didn't Know About Wake Words," retrieved from https://medium.com/@rowantrollope/7-things-you-didnt-know-about-wake-words-d4e9e041d11d on Oct. 1, 2021 (reader mode), published on Nov. 29, 2017 (6 pages). (Year: 2017).*

European Patent Office; International Search Report and Written Opinion of PCT Application No. PCT/US2019/046145; 12 pages; dated Apr. 14, 2020.

* cited by examiner

CONDENSED SPOKEN UTTERANCES FOR AUTOMATED ASSISTANT CONTROL OF AN INTRICATE APPLICATION GUI

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases be converted into text and then processed, and/or by providing textual (e.g., typed) natural language input.

When a user is concurrently interacting with an automated assistant and an application (e.g., web browser), inputs to the application can result in interruptions to actions being performed by the automated assistant, and vice a versa. This may, for example, result in the computing device(s) on which the automated assistant and application are being implemented needing to restart, from the beginning, certain actions which had already been partially performed prior to the interruption. This can place additional burden on the computing device(s). For example, the device(s) may be required to detect and process repeated spoken utterances related to the actions following the interruption, and may be required to process such repeated utterances and/or other repeated inputs to the device(s) (e.g. screen inputs) in order to complete the action following the interruption.

SUMMARY

Implementations set forth herein relate to an automated assistant that can mediate interactions between a user and GUI elements of an application, and also allow a user to provide condensed voice inputs to control intricate application GUIs. When such intricate application GUIs are not controllable via condensed voice input, a user may need to perform a variety of different touch gestures in order to control various GUI elements rendered at the application GUI. However, when such intricate application GUIs are controllable via condensed voice input, as facilitated by implementations discussed herein, interactions between the user and the application GUIs can be made more efficient for the computing apparatus on which the applications are implemented. Such efficiencies can result from reductions in power consumption and availability of processing bandwidth during interactions.

In order to allow users to provide condensed spoken utterances for controlling intricate application GUIs, an application corresponding to the intricate application GUI can be provided with content description data for static and/or dynamic GUI elements. Content description data can be stored in association with each GUI of the static and/or dynamic GUI elements, at least in part, to guide the automated assistant when responding to spoken utterances that are intended for controlling a particular GUI element. The automated assistant can compare natural language content of the spoken utterance to the content description data in order to identify one or more GUI elements that the user may be intending to control via the spoken utterance. When the automated assistant identifies a particular GUI element that the user is intending to control, the automated assistant can use the natural language content of the spoken utterance and/or data corresponding to the particular GUI element to identify an action to initialize in response to the spoken utterance from the user.

For instance, when the GUI element (e.g., a calendar for creating events) is configured to correlate a user input to a value (e.g., a month) that is selectable from multiple values (e.g., 1-12 months), the automated assistant can compare the natural language content of a spoken utterance to the multiple values and/or any other information associated with the GUI element. When the automated assistant determines that natural language content of the spoken utterance identifies a particular value of the multiple values associated with the GUI element, the automated assistant can then identify one or more actions capable of controlling the GUI element to reflect the particular value identified by the user. For example, when the user has provided a spoken utterance such as, "Assistant, set the date to 'July,'" the automated assistant can determine that a GUI element of an executing application has corresponding content description data that identifies "July." In response, an action "setDate( )" can be identified by the automated assistant and initialized via the executing application. The action "setDate('July')" can be initialized in order to cause the executing application to (i) render the GUI element in a way that reflects the selection of "July" as the selected month and (ii) modify a draft calendar event to be set for the month of July.

In some implementations, in response to the user providing the spoken utterance, the automated assistant can cause the display panel of the computing device to render a graphical indicator that indicates a selection of a particular GUI element. For instance, in response to receiving the spoken utterance, "Assistant, set the date to 'July'" and identifying the particular GUI element, the automated assistant can cause the display panel to render a graphical indicator at and/or near the particular GUI element. The graphical indicator can be, but is not limited to, a "halo," pattern, shape, and/or other coloration of a portion the application GUI at or near the particular GUI element.

In some implementations, in response to the automated assistant determining that the user has provided a spoken utterance in furtherance of controlling the application GUI, the automated assistant can enter a GUI control mode. While operating in the GUI control mode, the automated assistant can be responsive to spoken utterances from the user, without the spoken utterances necessarily including an invocation phrase such as, "Assistant." Alternatively, or additionally, while operating in the GUI control mode, the automated assistant can be responsive to condensed spoken utterances that do not explicitly identify actions for the automated assistant. Rather, in some implementations, the automated assistant can be responsive to any spoken utterance that has a correlation to one or more GUI elements being rendered at the application GUI when the user provided a particular spoken utterance.

As an example of the GUI control mode, the automated assistant can receive a subsequent spoken utterance such as "Also, the 15$^{th}$ at 8 O'clock PM," after the automated assistant received the spoken utterance, "Assistant, set the date to 'July.'" The user can provide the subsequent spoken utterance in furtherance of selecting a time for an event, after the user has already caused the automated assistant to select the month of July for the event. In response to receiving the initial spoken utterance, "Assistant, set the date to 'July,'" the automated assistant can transition into operating in the GUI control mode, thereby making subsequent interactions between the user and the automated assistant more efficient. Subsequent spoken utterances from the user can be processed according to the GUI control mode in furtherance of determining whether a subsequent spoken utterance is directed to an application GUI selection—despite the user not explicitly invoking the automated assistant in the spoken utterance. Furthermore, with prior permission from the user, subsequent spoken utterances can be processed for determining a correlation between natural language content of the subsequent spoken utterances and content description data associated with the application GUI elements. For instance, the subsequent spoken utterance "Also, the 15$^{th}$ at 8 O'clock PM" can be determined to correlate to a GUI element that identifies calendar days and another GUI element that identifies hours and minutes for an event being setup by the user.

When one or more terms in the natural language content correspond to a unique GUI element, the automated assistant can, in response, initialize a particular action for affecting each unique GUI element. However, when one or more terms in the natural language content correspond to multiple GUI elements, the automated assistant can cause a graphical indicator to be rendered at the application GUI to encourage the user to resolve ambiguity with their spoken utterance. The graphical indicator can put the user on notice that their spoken utterance has been interpreted to correspond to multiple GUI elements and also that no action was taken in response to the spoken utterance. Upon acknowledging or viewing the graphical indicator, the user can provide a different spoken utterance that puts the automated assistant on notice of the particular GUI element that the user originally intended to modify.

As an example, the application GUI can include a "Start Time" for an event and an "End Time" for the event, and each time can be selectable by the user. However, each time can have a corresponding "Date" field and "Time" field and therefore, in response to the user providing the subsequent spoken utterance, the automated assistant may identify the "Date" field and the "Time" field for both the "Start Time" and the "End Time" for the event. In order to identify the particular fields that the user is intending to affect with the subsequent spoken utterance, the automated assistant can cause a graphical indicator to be rendered at or near each field that has been identified based on the subsequent spoken utterance. In some implementations, the user can resolve ambiguity by providing one or more other spoken utterances that more particularly identify the field that the user is intending to affect. For example, when a graphical indicator is highlighting the Start Time "Time" field and the End Time "Time" field, the user can provide another condensed spoken utterance, such as, "Start," in order to select the Start Time "Time" field, without necessarily providing an invocation phrase (e.g., "Assistant . . . ") again.

Additionally, or alternatively, when the Start Time "Time" field and the End Time "Time" field are located adjacent to each other, the user can provide another condensed spoken utterance that indicates a portion of the application GUI that the intended field is located. As an example, the user can provide another spoken utterance such as "Left," or "Up," in order to indicate a location of the intended field to affect—at least relative the field that was not intended to be affected. In response to receiving the other spoken utterance that indicates the relative location of the intended field, the automated assistant can identify the intended field and then execute the selection of a value provided at the intended field. For instance, the automated assistant can select the Start Time "Time" field as the field to modify to indicate a selection of "8 O'clock PM."

Additionally, or alternatively, because the second spoken utterance (e.g., "Also, the 15$^{th}$ at 8 O'clock PM.") included multiple selections (e.g., the 15$^{th}$ and 8 O'clock PM), the automated assistant can affect multiple GUI elements based on the direction-related spoken utterance (e.g., "Left," or "Up,"). For example, in response to receiving the direction-related spoken utterance, the automated assistant can modify the Start Time "Time" field to identify "8:00 PM" and the Start Time "Date" field to identify "15," at least based on the Start Time fields being to the "left," or "up" from, the End Time fields. In this way, the user does not need to provide subsequent spoken utterances after the direction-related spoken utterance, but, rather, can rely on the automated assistant recalling and acting on the previously provided condensed spoken utterances.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
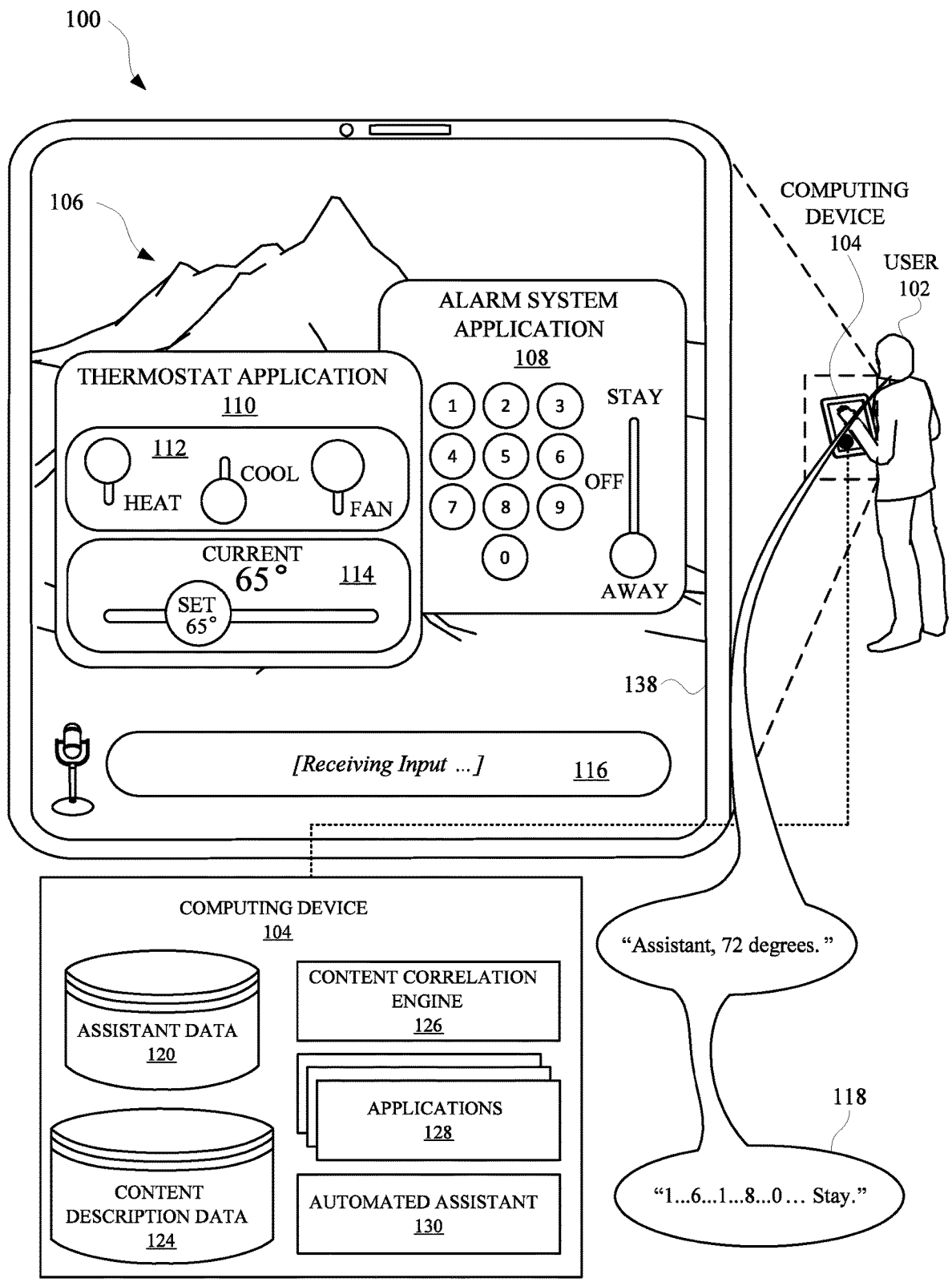
FIG. 1A, FIG. 1B, FIG. 1C, and FIG. 1D illustrate a view of a user controlling one or more applications using condensed spoken utterances correlated to content description data.
Figure 1B:
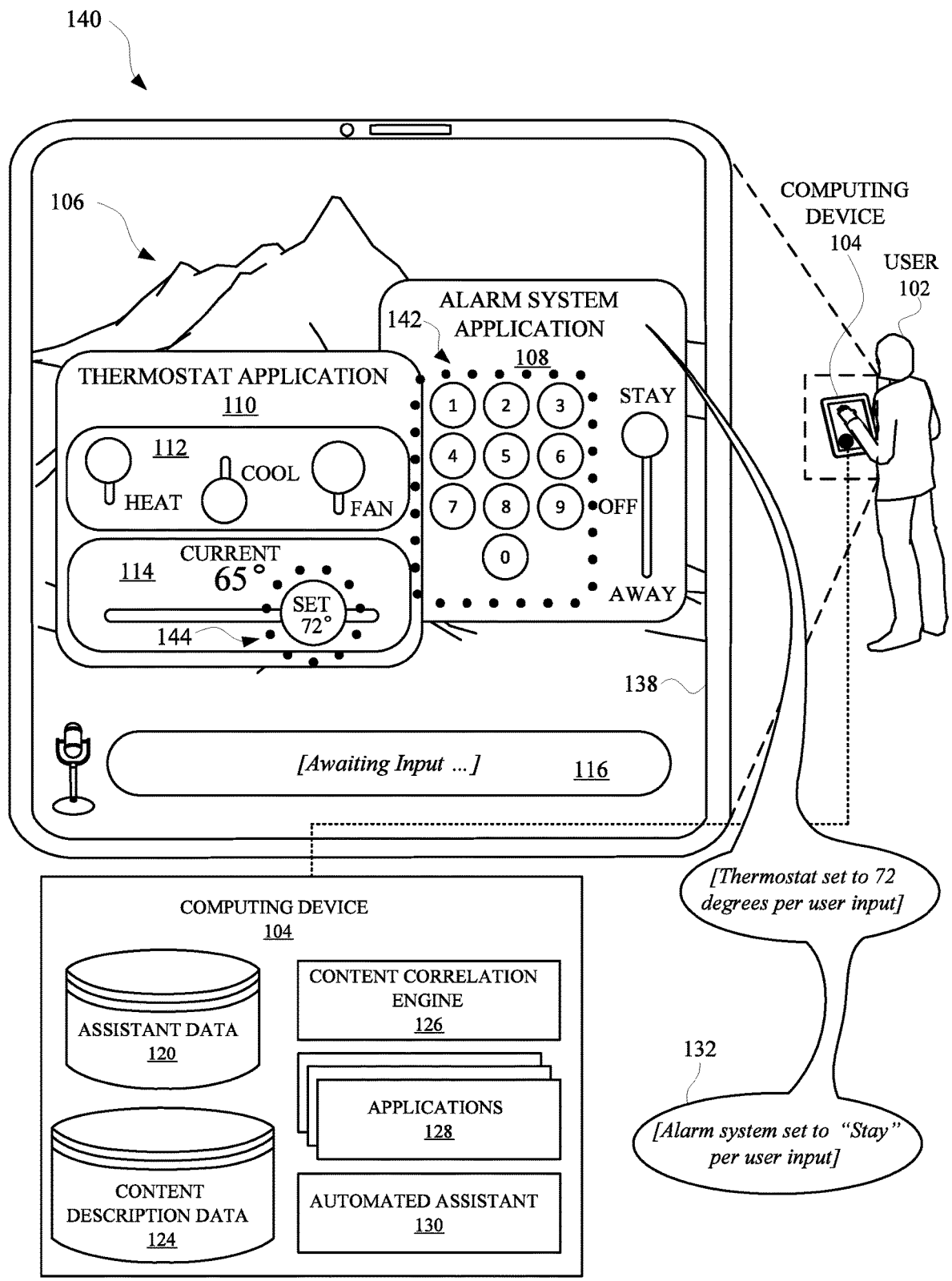

FIG. 1A, FIG. 1B, FIG. 1C, and FIG. 1D illustrate a view 100, a view 140, a view 150, and a view 160, respectively, of a user 102 controlling one or more applications using condensed spoken utterances correlated to content description data 124. Specifically, the user 102 can provide a spoken utterance 118 to initialize an automated assistant in furtherance of controlling one or more application GUI elements being rendered at a display device 138 of a computing device 104. For example, the user 102 can access a thermostat application 110 and an alarm system application 108 via the computing device 104. The computing device 104 can provide access to an automated assistant 130, which can control the thermostat application 110 and the alarm system application 108 according to spoken utterances from the user 102.

In order to determine whether the user 102 is providing a spoken utterance in furtherance of controlling one or more applications 128, the automated assistant 130 and/or a content correlation engine 126 can compare content description data 124 to natural language content of a received spoken utterance. The content description data 124 can include information characterizing one or more properties of one or more GUI elements that can be rendered by the applications 128. A GUI element can include one or more of an image, an input field, a menu, a submenu, a link, a button, a checkbox, a switch, a calendar, an index (e.g., page index), a slider, a carousel, a notification (e.g., a pop-up message), a progress indicator, a menu element, a sub-menu element, multiple menu elements, and/or any other GUI element that can be provided at a GUI of a computing device. When a particular GUI element of an application 128 is being rendered at the display device 138, information provided with the content description data 124 can be omitted from the display device 138 or be rendered at the display device 138. For example, content description data 124 corresponding to a set of elements 112 can include terms such as, "On," "Off," and "Auto." However, such terms may or may not be rendered at the display device 138 with the set of elements 112. Alternatively, or additionally, another set of elements 114 can include a current temperature reading (e.g., 65 degrees) of a home of the user and a horizontal controllable scroll bar that indicates a temperature setting for the thermostat application 110. Content description data 124 corresponding to the other set of elements 114 can include terms such as, "degrees," "Fahrenheit," "Celcius," and/or any other term that can be associated with adjustments in temperature.

In order to effectuate control of the thermostat application 110 and/or the alarm system application 108 via condensed spoken utterances, correlations between content of the spoken utterances 118 can be compared to the content description data 124. For example, the user 102 can provide the spoken utterance 118, which can include natural language content such as, "Assistant, 72 degrees," and after a few seconds pause by the user 102, the user 102 can provide a subsequent spoken utterance such as "1 . . . 6 . . . 1 . . . 8 . . . 0 . . . Stay." In response to receiving the initial spoken utterance, as indicated by status 116, the automated assistant 130 can determine that the user 102 is intending to control one or more applications of the computing device 104. Based on this determination, the automated assistant 130 can transition to operating in a GUI control mode. While operating in the GUI control mode, the user 102 can omit invocation terms and/or phrases, such as "Assistant," from subsequent spoken utterances when controlling one or more GUI elements via the automated assistant 130.

In some implementations, the user 102 can compare the natural language content of the spoken utterances 118 to the content description data 124 in order to identify a particular GUI element that the user 102 is intending to control. The initial spoken utterance can include the terms "72" and "degrees," which can correspond to the term "degrees" provided by the content description data 124 in association with the other set of elements 114. The initial spoken utterance can be provided without an explicit identification of an action to be performed. For instance, the terms "modify," "set," and/or "change" can be omitted from the initial spoken utterance, while still allowing the user 102 to control the automated assistant 130 to effectuate modifications to settings to applications 128. When the automated assistant 130 receives the initial spoken utterance " . . . 72 degrees," the automated assistant 130 can identify the other set of elements 114 based on the correlation between the term "degrees" of the initial spoken utterance and the term "degrees" provided in the content description data 124 in association with the other set of elements 114.

In some implementations, a correlation between natural language content of a spoken utterance and a GUI element can be determined based on one or more processes conducted at the direction of the computing device 104. For example, in some implementations, a correlation between the natural language content of the spoken utterance and a GUI element can be identified when the natural language content of the spoken utterance shares one or more terms, phonemes, words, and/or phrases in common with one or more terms, phonemes, words, and/or phrases associated with the GUI element and/or one or more inputs previously provided to control the GUI element and/or a similar GUI element. As an example, one or more inputs could have been previously provided by one or more other users to control and/or initialize an action associated with a GUI element of an application. In some implementations, the data characterizing the one or more inputs, such as, but not limited to, search strings and/or other natural language inputs, can be used to train one or more machine learning models. A resulting trained machine learning model can thereafter be used to determine a suitable action and/or GUI element to control in response to a spoken utterance from a user. In some implementations, one or more trained machine learning models can be trained according to interactions between one or more users and a website domain, and/or one or more users and a group of website domains.

Additionally, or alternatively, one or more trained machine learning models can be trained using website data that indicates a location of particular GUI elements within a webpage. For example, computer code for one or more web sites can be arranged in a hierarchy (e.g., document object model), which can indicate a relative location of GUI elements to other GUI elements and/or features of a webpage. A machine learning model that is trained according to such information can be used to identify a particular GUI element that a user may be intending to control via a spoken utterance provided to an automated assistant. For example, meta data and/or other structured markup data that is stored in association with a particular GUI element can be used to identify another GUI element that is also associated with similar meta data and/or structured markup data.

In some implementations, the automated assistant 130 and/or the content correlation engine 126 can identify a parameter and/or slot value corresponding to the natural language content of the initial spoken utterance 118. For instance, the automated assistant 130 can determine that the other set of elements 114 have a slot value of "65," which the user is permitted to modify via a GUI input and another slot value "65" that the user is not permitted to modify via a GUI input. Therefore, based on permissions associated with the other set of elements 114, the automated assistant 130 can identify an action to initialize in furtherance of modifying the slot value "65" to be "72." In some implementations, based on the identified action (e.g., Application_Intent (modify_set_temp [set, current, Fahrenheit])), the automated assistant 130 can generate assistant data 120 that characterizes application input data to be provided by the automated assistant 130 to the thermostat application 110. In some implementations, the application input data can characterize one or more gestures (e.g., a swipe gesture) that, if provided by the user 102 to the display device 138, would effectuate the requested modification of the set temperature from 65 degrees to 72 degrees. For example, the automated assistant 130 can generate application input data such as, "Gesture_Input(touch_display ([swipe, horizontal_right], start(17,28), end(24, 28)))," which can be provided from the automated assistant 130 to the thermostat application 110, and/or from the automated assistant 130, to an operating system of the computing device 104, to the thermostat application 110. If the automated assistant 130 and/or the content correlation engine 126 does not identify a parameter and/or slot value corresponding to the natural language content of the initial spoken utterance 118, the input data referred to above is not generated. The automated assistant, for example, may refrain from generating the input data.

When the automated assistant 130 is operating in the GUI control mode, the user 102 can provide a subsequent spoken utterance 118, in furtherance of controlling another application, such as the alarm system application. Specifically, the user 102 can provide a numerical code (e.g., "1 . . . 6 . . . 1 . . . 8 . . . 0 . . . ") to be input via a number pad GUI element at the alarm system application 108 and a mode value (e.g., "stay") in order to modify another GUI element that allows for switching between modes, as depicted in FIG. 1A. In response, and as depicted in view 140 of FIG. 1B, a status 132 of the computing device 104 can indicate that the alarm system has been set to "stay" per the user input. The unlocking of the alarm system and the change in mode can be performed in response to the subsequent spoken utterance 118, which did not expressly identify the automated assistant 130 and/or include an invocation phrase.

In some implementations, content description data 124 can be generated by the automated assistant 130 using image recognition processing on one or more screen shots. The screen shots can be captured via the automated assistant 130 and/or another application, and can include GUI elements of the thermostat application 110 and other GUI elements of the alarm system application 108. In some implementations, data generated from the image recognition process can be used in combination with content description data 124 provided by a third party entity in order to identify a correspondence between content of a spoken utterance that the user 102 is providing and one or more GUI elements that the user is intending to control.

In some implementations, the content description data 124 can be an application programming interface (API) that provides a user with an ability to provide spoken utterances to an automated assistant in order to initialize application actions that could otherwise be initialized via one or more gestures to an application GUI provided by the application. In other words, the API can "point" from an action initialized via a particular GUI element to one or more phonemes, terms, and/or phrases, which can be included in a spoken utterance to the automated assistant to cause the action to be initialized by the application.

In some implementations, content description data 124 can indicate a status of each GUI element for each application 128, and can therefore identify GUI elements that are in the foreground, background, minimized, active, inactive, and/or in any other operating status. In this way, when the user 102 is aware that a particular application with a particular GUI element is active but not in the foreground, the user 102 can nonetheless control the particular GUI element via a condensed spoken utterance. For example, the thermostat application 110 can cover up the number pad GUI element of the alarm system application 108, but the user 102 can nonetheless control the number pad GUI element via the subsequent spoken utterance 118 when the content description data 124 indicates that the number pad GUI element is active but in the background.

In some implementations, the automated assistant 130 can cause one or more graphical indicators to be rendered at or near each GUI element that the user 102 has identified. The graphical indicators can put the user 102 on notice of the GUI elements that the automated assistant 130 has identified as being the subject of one or more spoken utterances from the user 102. For example, based on comparing the content of the spoken utterances 118 to the content description data 124, the automated assistant 130 can cause a first graphical indicator 144 (e.g., highlighting and/or other graphical pattern around the horizontal scroll bar), and a second graphical indicator 142 (e.g., highlighting and/or other graphical pattern around the number pad GUI element) to be rendered at the display device 138. These graphical indicators can provide visual indications of the GUI elements that the automated assistant 130 has identified as being targeted by the user 102 via a spoken utterance.

Figure 1C:
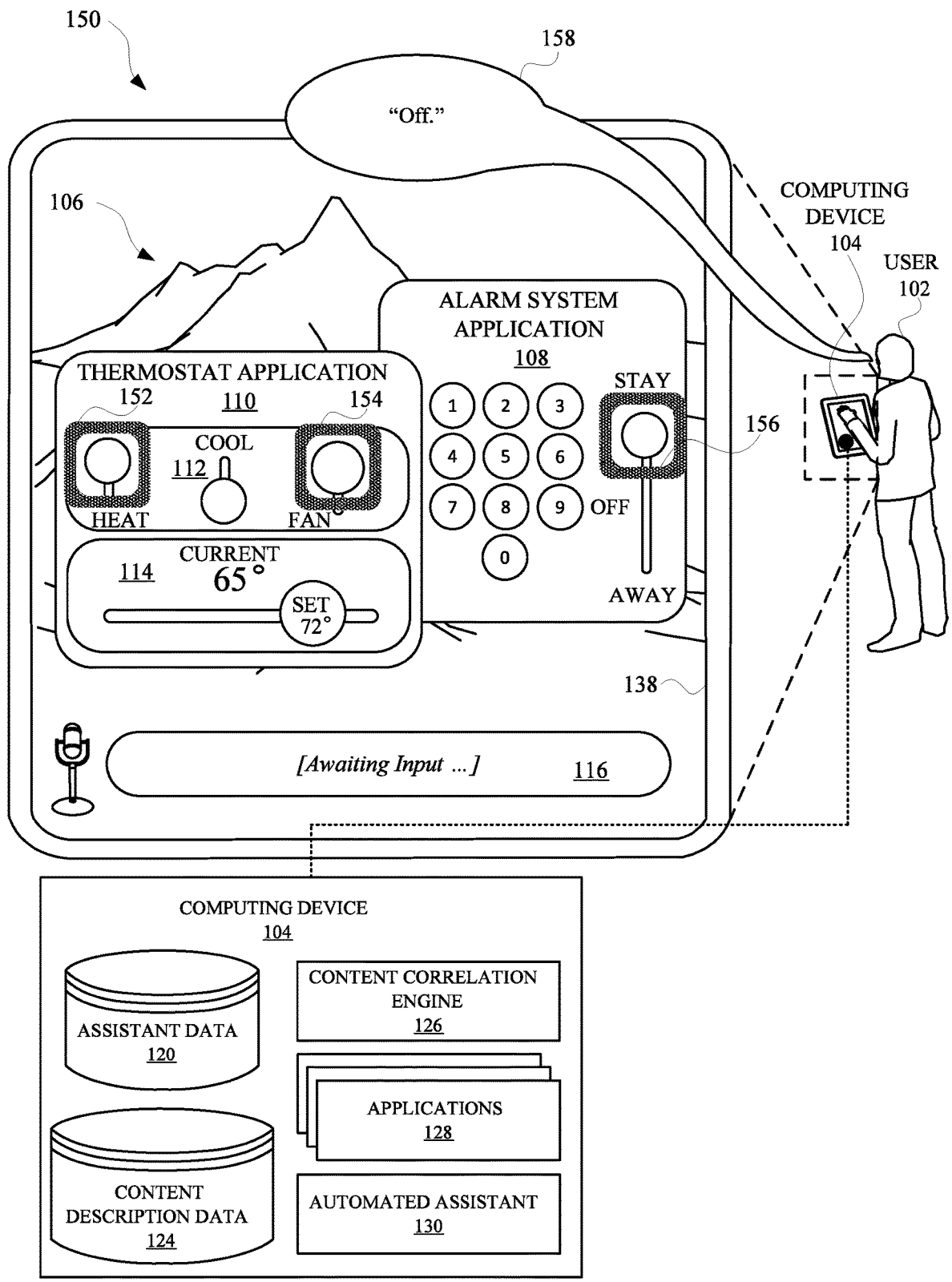

FIG. 1C illustrates a view 150 of the automated assistant 130 identifying multiple different GUI elements in response to a condensed spoken utterance 158 from the user 102. Specifically, the automated assistant 130 can be operating in a GUI control mode when the user 102 provides the condensed spoken utterance 158, "Off" In response to receiving the spoken utterance 158, the automated assistant 130 and/or the content correlation engine 126 can determine that the spoken utterance 158 corresponds to multiple different entries in the content description data 124. For example, the automated assistant 130 can determine that the term "Off" corresponds to an entry for the "heat" switch of the set of GUI elements 112, the "fan" switch of the GUI elements 112, and an "off" switch provided at the alarm system application 108.

In some implementations, the automated assistant 130 can identify entries in the content description data 124 corresponding to GUI elements that are rendered in a foreground of the display device 138 and other GUI elements that are not rendered in the foreground of the display device 138. Additionally, or alternatively, the automated assistant 130 can determine that at least some GUI elements correspond to the spoken utterance 158 despite natural language content rendered at or near the GUI elements not including the same content from the spoken utterance 158. As an example, the automated assistant 130 and/or the content correlation engine 126 can identify the "heat" switch and the "fan" switch as having entries in the content description data 124 that includes the term "off." Furthermore, the automated assistant 130 can determine that one or more executing applications are rendering the term "off" at or near a particular user-controllable GUI element. For instance, the automated assistant 130 can determine that the alarm system application 108 is rendering the term "off" in association with the user-controllable status switch (e.g., switch having positions such as "stay," "off" and "away"). Based on this determination, the automated assistant 130 can cause the display device 138 to render a first graphical indicator 152 at or near the "heat" switch, a second graphical indicator 154 at or near the "fan" switch, and a third graphical indicator 156 at or near the user-controllable status switch.

Figure 1D:
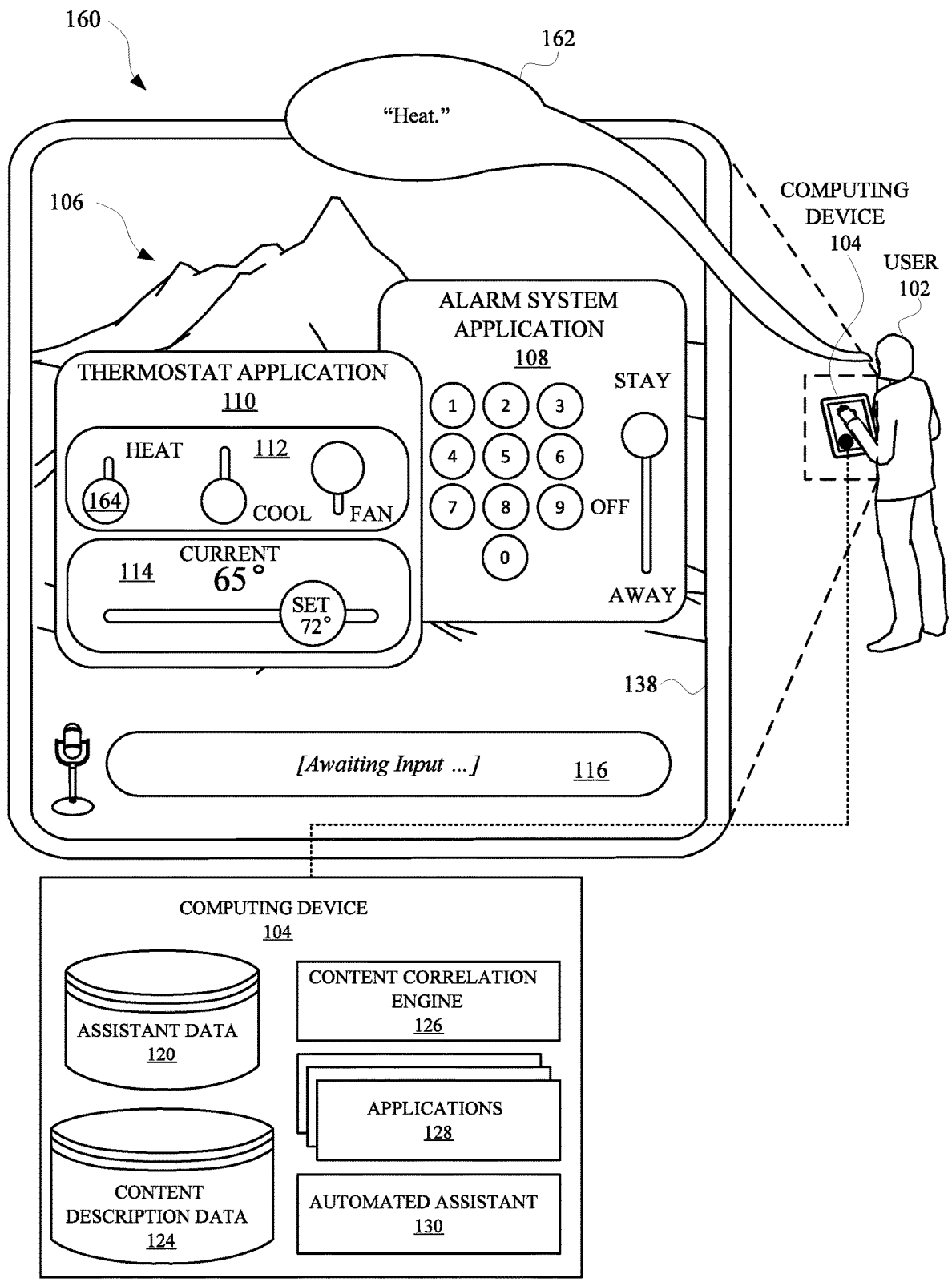

As provided in view 160 of FIG. 1D, the user 102 can provide a subsequent spoken utterance 162 in order to assist the automated assistant 130 with further identifying a particular GUI element that the user intended to control. Specifically, in response to the user 102 providing the subsequent spoken utterance 162 while the graphical indicators are rendered at the display device 138, the automated assistant 130 can compare content of the subsequent spoken utterance 162 to content of entries in the content description data 124 that correspond to the graphical indicators. When the automated assistant 130 determines that content of the spoken utterance 162 corresponds to an entry in the content description data 124 that has been associated with a graphical indicator, the automated assistant 130 can identify one or more actions for fulfilling the spoken utterance 158 and subsequent spoken utterance 162 from the user 102. Specifically, the automated assistant 130 can identify an action for changing a status 164 of the "heat" switch to an "off" position, based on content of both the spoken utterance 158 and the subsequent spoken utterance 162. In this way, the user 102 does not necessarily need to repeat invocation phrases to keep the automated assistant 130 active, which might otherwise result in delayed execution of requested actions and wasting of certain computational resources. Furthermore, the user 102 can provide more condensed spoken utterances for interacting with a graphical user interface.

In some implementations, properties of each graphical indicator can be stored as assistant data 120 and can indicate locations of each graphical indicator relative to each other. In this way, the user 102 can provide simpler spoken utterances in order to identify a particular GUI element that the user 102 is intending to control. For example, in order to identify the "heat" switch at FIG. 1C, the user 102 could have provided a subsequent spoken utterance such as "left," in order to identify the controllable GUI element that has a graphical indicator at the left-most portion of the display device 138.

Figure 2:
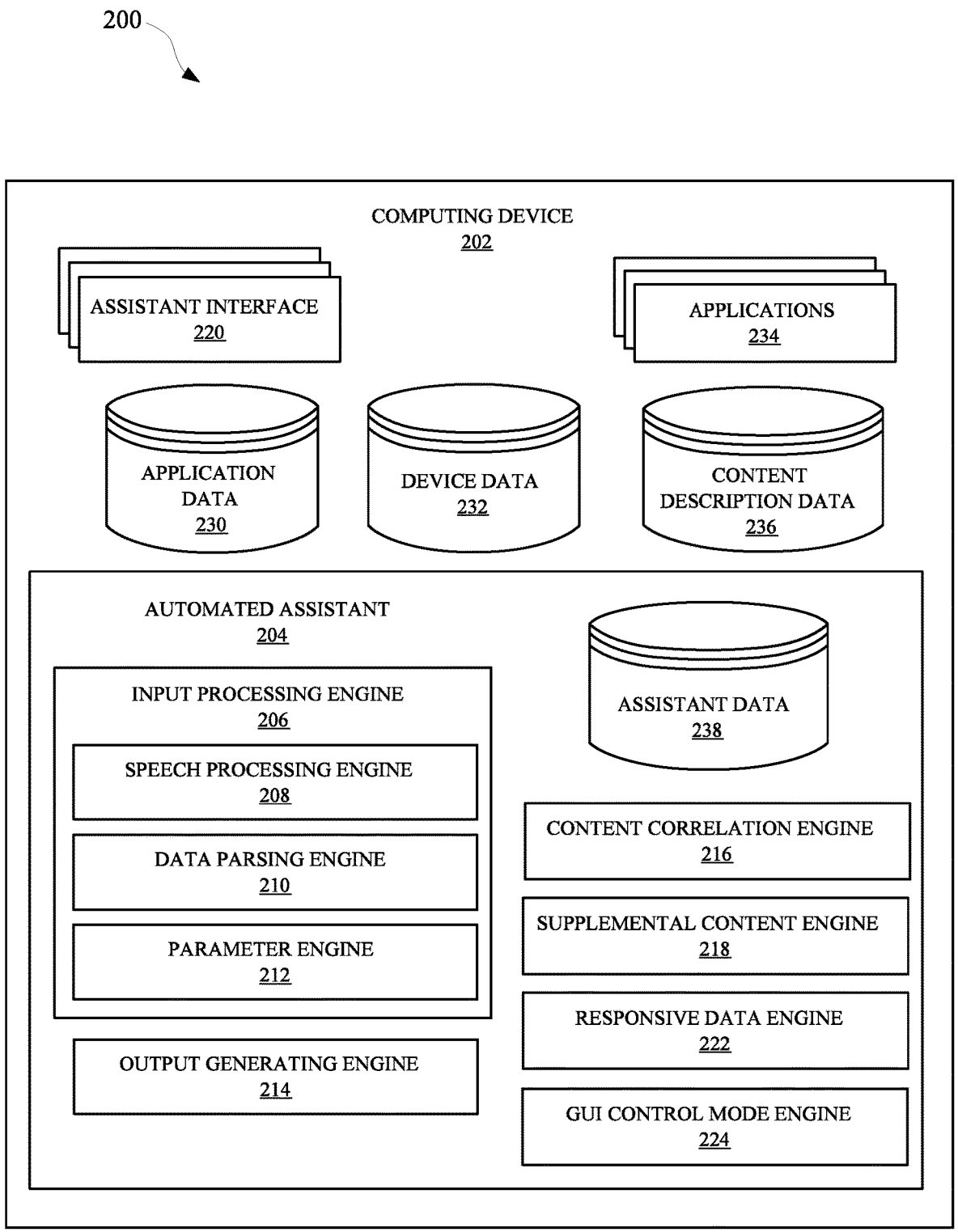
FIG. 2 illustrates a system for providing an automated assistant that can control graphical user interface (GUI) elements via voice input using content description data and/or natural language understanding (NLU) of GUI content in order to resolve ambiguity and/or allow for condensed GUI voice input requests.

FIG. 2 illustrates a system 200 for providing an automated assistant 204 that can control graphical user interface (GUI) elements via voice input using natural language understanding (NLU) of GUI content in order to resolve ambiguity and/or allow for condensed GUI voice input requests. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to perform a function (e.g., provide data, control a peripheral device, access an agent, generate an input and/or an output, etc.). The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera and/or a microphone, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data. NLU data can include intent(s) that correspond to the spoken utterance and optionally parameter(s) (e.g., slot values) for the intent(s).

On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. The automated assistant 204 and/or the computing device 202 can access application data 230 to determine one or more actions capable of being performed by one or more applications 234, as well as a state of each application of the one or more applications 234. Furthermore, the application data 230 and/or any other data (e.g., device data 232) can be accessed by the automated assistant 204 to generate contextual data, which can characterize a context in which a particular application 234 is executing at the computing device 202 and/or a particular user is accessing the computing device 202.

While one or more applications 234 are executing at the computing device 202, the device data 232 can characterize a current operating status of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the automated assistant 204 in order to determine a suitable action to initialize via the automated assistant 204.

In some implementations, the computing device 202 can store content description data 236, which can characterize various GUI elements corresponding to one or more different applications 234. For example, when a particular application 234 is installed at the computing device 202 and/or otherwise accessed by the computing device 202, the computing device 202 can download content description data 236 for the particular application 234. The content description data 236 can be accessed by the automated assistant 204 in order to identify one or more GUI elements that a particular user is intending to control via a spoken utterance. Each portion of content description data 236 that corresponds to a particular GUI element for an application 234 can be static or dynamic. For example, when content description data 236 is dynamic, the content description data 236 can be updated according to inputs to and/or outputs from the computing device 202. For instance, when a user provides a spoken utterance in furtherance of modifying a particular GUI element, and the automated assistant 204 causes a change to the particular GUI element, the content description data corresponding to the particular GUI element can be modified by the corresponding application 234, the computing device 202, and/or the automated assistant 204 in order to reflect the change to the particular GUI element.

The computing device 202 and/or the automated assistant 204 can further include a content correlation engine 260. The content correlation engine 216 can process natural language content of inputs from the user in order to determine whether the natural language content corresponds to one or more GUI elements. A correlation between the natural language content of a spoken utterance and a particular entry in the content description data 236 can be identified when one or more terms of the natural language content are provided in the particular entry in the content description data 236. Alternatively, or additionally, a correlation between the natural language content of a spoken utterance and a particular entry in the content description data 236 can be identified when one or more terms of the natural language content are determined to be synonymous with one or more terms in a particular entry of the content description data 236. Alternatively, or additionally, a correlation between the natural language content of a spoken utterance and a particular entry in the content description data 236 can be identified when one or more terms of the natural language content characterize a particular feature of a GUI element that the entry of the content description data 236 also characterizes.

For example, when an application GUI of a particular application 234 is rendering a dial GUI element that mimics a volume dial of a stereo, content description data 236 corresponding to the dial GUI element can include one or more terms such as "turn," "clockwise," and/or "counter clockwise." Therefore, when the user provides a spoken utterance such as, "turn up," while the application GUI is being simultaneously rendered at a display panel of the computing device 202, the automated assistant 204 can determine that there is a correlation between the term "turn" of the content of the spoken utterance and the term "turn" of the content description data 236. In some implementations, based on determining the correlation, the automated assistant 204 can identify a current value corresponding to the GUI element, and cause the value to be modified based on the spoken utterance provided by the user. For example, when the dial GUI element is rendered at a halfway position, thereby indicating a value of 50%, the automated assistant 204 can cause this value to be increased based on the user providing bespoken utterance, "turn up." The initial value of 50% can be identified by the content description data 236, application data 230, and/or other data characterizing values at the graphical user interface of the computing device 202.

For instance, in some implementations, the automated assistant 204 can employ a supplemental content engine 218 in order to generate additional content description data based on features of the computing device 202 and/or information provided during an interaction between the user and the automated assistant 204. The supplemental content engine 218 can process image data corresponding to a screenshot of the display interface of the computing device 202 in order to generate the additional content description data. When the display interface is rendering content from multiple different applications 234, the automated assistant 204 can use the content description data 236 for each of the applications 234 in order to correlate each portion of rendered content to each respective application 234. This can allow the automated assistant to receive spoken utterances directed at multiple different applications that are being simultaneously rendered and/or otherwise represented at a display interface of the computing device 202.

In some implementations, in order to initialize one or more actions to be performed by one or more applications 234, the computing device 202 and/or the automated assistant 204 can include a responsive data engine 222. The responsive data engine 222 can use content description data 236 in order to generate responsive data that can be used to initialize one or more actions to be performed by one or more applications 234. For example, in response to receiving a spoken utterance, the automated assistant 204 can identify a particular application GUI element that the user is intending to modify via the spoken utterance. In some implementations, a GUI control mode engine 224 can cause the automated assistant 204 to operate in a GUI control mode in response to receiving a spoken utterance while one or more user-controllable GUI elements are rendered at a display interface that is in communication with the computing device 202. The automated assistant 204 can use the content correlation engine 216 to identify content description data 236 corresponding to the particular application GUI element. A portion of the content description data 236 that correlates to the content of the spoken utterance can be accessed by the responsive data engine 222, in order for the responsive data engine 222 to generate input data that is actionable by the particular application corresponding to the application GUI element. Where the automated assistant 204 does not identify content description data 236 corresponding to the particular GUI element, the input data may not be generated.

As an example, the responsive data engine 222 can generate gesture data characterizing one or more gestures that can effectuate one or more changes intended to be set forth by the user via the spoken utterance. For example, when the application GUI element is a rotatable dial icon, the responsive data engine 222 can generate data characterizing a rotating gesture, similar to a user using one or more extremities to "turn" the rotatable dial icon at a touch display interface of the computing device 202. Alternatively, when the application GUI element is a scroll bar, and the correlated portion of content description data 236 indicates that the scroll bar is at a lowest position at the display interface, the responsive data engine 222 can generate data characterizing a gesture that would displace the scrollbar from the lowest position to a position identified by the user via a spoken utterance. For example, when the user provide the spoken utterance, "up," the automated assistant can cause the responsive data engine 222 to generate a default value corresponding to a default distance from a current position of the scroll bar to particular position above the current position.

In some implementations, the supplemental content engine 218 can generate additional content description data based on one or more spoken utterances from the user in order to provide further context for subsequent spoken utterances provided by the user in furtherance of manipulating an application GUI. As an example, the user can be interacting with an application GUI corresponding to an application 234 that controls a thermostat of a home of the user. The application GUI can include a text field for inputting a temperature that the thermostat will be set too. Initially, the user can provide a spoken utterance such as, "Assistant, set the thermostat to 68 degrees," while the application GUI and text field are being rendered at the display interface. In response, the content correlation engine 216 can identify a correlation between content of the aforementioned spoken utterance and an entry in the content description data 236. For example, the entry in the content description data 236 can include natural language content such as, "temperature" and "degrees," thereby providing a correlation between the spoken utterance and the entry in the content description data 236. Based on this correlation, the automated assistant 204 can cause the application 234 to change a setting of the thermostat from a current position to a position corresponding to 68°.

Furthermore, the supplemental content engine 218 can generate supplemental content description data that characterizes a current position of the temperature of the thermostat as valued at 68. Should the user want to change the thermostat, the user can provide a subsequent spoken utterance such as, "Change 68 to 72." Because the subsequent spoken utterance does not have a direct correlation to the content description data 236, or at least the natural language content "temperature" and "degrees," the automated assistant 204 can rely on the supplemental content description data in order to identify a particular application GUI element that the user is intending to control. For instance, because the supplemental content description data includes the value "68," the automated assistant 204 and/or the content correlation engine 216 can determine that the subsequent spoken utterance and the supplemental content description data have a direct correlation.

As a result, the automated assistant 204 and/or the responsive of data engine 222 can generate action data for initializing an action to change the setting of the value in the text field for the temperature of the thermostat from 68° to 72°. For example, reaction data can characterize one or more gestures for selecting the text field, deleting the current value of 68, and typing in the new value of 72. Based on this change, the supplemental content description data can be modified to indicate that the value 72 is being rendered within the temperature text field at the application GUI. In this way, should the user again want to change the value in the temperature field using another spoken utterance, the automated assistant 204 will be able to identify play particular GUI element that the user is intending to control despite the original content description data 236 possibly not indicating the current value.

Figure 3:
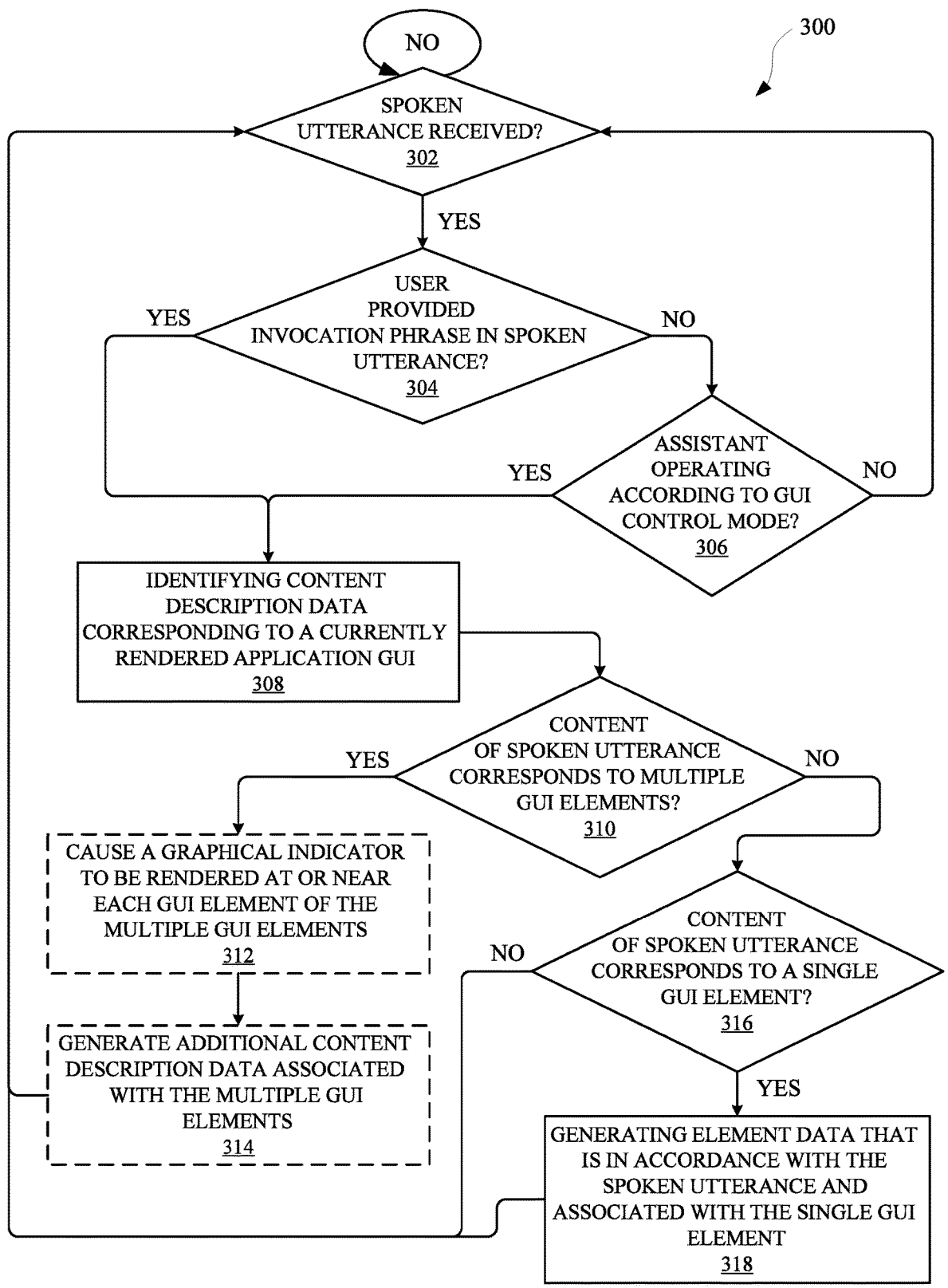
FIG. 3 illustrates a method for allowing a user to provide condensed spoken utterances in order to control application graphical user interface, which can otherwise be controllable via one or more just your inputs.

FIG. 3 illustrates a method 300 for allowing a user to provide condensed spoken utterances in order to control application graphical user interface, which can otherwise be controllable via one or more user inputs. The application GUI can be controlled by the user using spoken utterances that may not necessarily included invocation phrases and/or order one or more words identifying an automated assistant. The method 300 can be performed by one or more computing devices, applications, and/or any other apparatus or module capable of providing access to an automated assistant. The method 300 can include an operation 302 of determining whether a user has provided a spoken utterance to an interface of a computing device. The computing device can include one or more interfaces such as a touch display panel, one or more speakers, and/or one or more microphones. The spoken utterance can be provided by the user when an application GUI is being rendered at the touch display panel of the computing device. The application GUI to be rendered by an application that is controllable via one or more input gestures at the touch display panel and/or any other interface. For example, the application can be a device control panel application for controlling various devices connected over a local area network accessible in a home of the user. The application GUI can include various different GUI elements such as, buttons, drop down menus, text input fields, and/or any other type of GUI element. Furthermore, the device control panel application can control various devices such as an air conditioner, a furnace, a Wi-Fi router, various different lights, a security system, computers, and/or any other appliance or apparatus that can be controllable via an application.

The method 300 can further include an operation 304 of determining whether the user provided an invocation phrase in the spoken utterance. The invocation phrase can be one or more words intended by the user to identify the automated assistant in furtherance of initializing an interaction between the user and the automated assistant. For example, the spoken utterance provided by the user can be, "Assistant, 68 degrees," wherein "Assistant" is the invocation phrase. In response to receiving the spoken utterance, the automated assistant can determine that spoken utterance includes the invocation phrase of, "Assistant." Therefore, in this instance, the method 300 can proceed from the operation 304 to an operation 308. However, when the invocation phrase is not included in the spoken utterance, the message can proceed from the operation 304 to an operation 306.

The operation 306 can include determining whether the automated assistant is operating according to a GUI control mode. When operating in the GUI control mode, the automated assistant can be responsive to spoken utterances that may not necessarily include an invocation phrase and/or one or more words identifying the automated assistant. As an example, when operating in the GUI control mode, the automated assistant can be responsive to a spoken utterance such as, "off," in order to toggle a GUI element corresponding to an on-off switch for a particular device. However, when the automated assistant is not operating in the GUI control mode and the user provides a spoken utterance that does not include an invocation phrase, the method 300 can proceed from the operation 306, and subsequently return to the operation 302 of detecting whether a subsequent spoken utterance has been provided by the user.

The operation 308 can include identifying content description data corresponding to the currently rendered application GUI. In some implementations, the content description data can be stored in association with the application and at a location that is accessible to the automated assistant. For example, the automated assistant can be provided prior permission to access content description data that characterizes various GUI elements being rendered at the touch display panel of a computing device by one or more different applications. In this way, in response to receiving a spoken utterance, the automated assistant can make a determination regarding whether the user is intending to control one or more GUI elements being rendered at the touch display panel. In some implementations, the content description data can be provided by a third-party entity that provided the application, but that is different from an entity that provided the automated assistant and/or an operating system on which the application is executing. The content description data can include static data and/or dynamic data, depending on a particular GUI element that a portion of the content description data is characterizing. In some implementations, the application and/or the automated assistant can generate supplemental content description data that can be dynamically updated according to whether a user is interacting with an application GUI and/or one or more GUI elements. In this way, should the user identify content that was not originally identified by the content description data, but nonetheless is associated with an application GUI, the automated assistant can be responsive to a spoken utterance that identifies such content.

The method 300 can proceed from the operation 308 to an operation 310, which can include determining whether content of the spoken utterance corresponds to multiple GUI elements. The automated assistant can determine that a spoken utterance corresponds to multiple GUI elements when natural language content of the spoken utterance includes content that is associated with multiple GUI elements. For example, the user can provide a spoken utterance such as, "turn up," which can correspond to multiple GUI elements such as a dial for adjusting temperature of a thermostat and another dial for adjusting volume of music being projected by a stereo system. Content description data characterizing the dial and the other dial can include entries with the word "up," thereby causing the automated assistant to identify multiple GUI elements that correspond to the spoken utterance, "turn up." However, when there is only a single dial rendered at the application GUI, the automated assistant can determine that the spoken utterance only corresponds to a particular GUI element.

When content of the spoken utterance corresponds to multiple GUI elements, the method 300 can proceed from the operation 310 to an optional operation 312, which can include causing a graphical indicator to be rendered at or near each GUI element of the multiple GUI elements. As an example, when a first GUI element and a second GUI element rendered at an application GUI are determined to correspond to the spoken utterance, the automated assistant can cause one or more colors to be rendered at or near the first GUI element and the second GUI element. The one or more colors can put the user on notice that multiple GUI elements were identified in response to a most recent spoken utterance from the user. The user can then decide whether to further specify a particular GUI element that the user intended to control.

The method 300 can optionally proceed from the operation 312 to an optional operation 314, which can include generating additional content description data associated with the multiple GUI elements. In some implementations, the additional content description data can characterize the one or more graphical indicators rendered via operation 312. For example, multiple different colors, values, text and/or other indicators can be rendered at or near each GUI element of the multiple GUI elements identified as corresponding to the spoken utterance. The additional content description data can therefore characterize each of the multiple different colors, values text, and/or other indicators. In this way, when the user provides a subsequent spoken utterance in order to further specify the particular GUI element that they intended to control, the content of the subsequent spoken utterance can be compared to the original content description data as well as the additional content description data.

For example, the method 300 can proceed from the operation 314 to the operation 302 in order to detect a subsequent spoken utterance from the user. The user can provide a subsequent spoken uttering such as, "red," in order to identify a color that has been used to highlight at least one GUI elements of the multiple GUI elements. When the user provide the subsequent spoken utterance, the automated assistant can be operating according to the GUI control mode, thereby allowing the user to provide the subsequent spoken utterance without an invocation phrase. Therefore, in response to the subsequent spoken utterance, the automated assistant can compare content of the subsequent spoken utterance to (i) the content description data and (ii) the additional content description data in order to identify a particular GUI element that the user is referring to. When the automated assistant identifies the particular GUI element that is highlighted in "red" color, the automated assistant can recall the initial spoken utterance provided by the user (prior to providing the subsequent spoken utterance), and initialize performance of an action corresponding to the particular GUI element that is highlighted in red and in furtherance of the filling the initial spoken utterance provided by the user.

When, at the operation 310, the content of the spoken utterance does not correspond to multiple GUI elements, the method 300 can proceed from the operation 310 to an operation 316. The operation 316 can include determining whether content of the spoken utterance corresponds to a single GUI element. When the content of the spoken utterance is determined to not correspond to a single GUI element, the method 300 can return to the operation 302 in order to detect any subsequent spoken utterances from one or more users. However, when the content of the spoken occurrence is determined to correspond to a single GUI element, the method 300 can proceed from the operation 316 to an operation 318.

The operation 318 can include generating element data that is in accordance with the spoken utterance and associated with a single GUI element. As an example, when the user has provided the spoken utterance, "Assistant, 68 degrees," the automated assistant can generate element data that includes the value of 68 and/or identifies an element identifier for the single GUI element. In this way, when the single GUI element is a text field, the automated assistant can cause the value "68" to be input into the text field as if the user. Alternatively, or additionally, the automated assistant can generate gesture data characterizing a particular gesture that would modify the single GUI element (if the user performed the particular gesture) and cause the single GUI element to reflect the content of the spoken utterance. For example, when the single GUI element corresponds to a scroll bar, the automated assistant can generate data characterizing a gesture that would effectuate a change in position of the scrollbar from a current position to another position that characterizes a value of 68 degrees for the scroll bar.

In some implementations, the automated assistant can initialize an action based on the gesture data to "trick" the application into thinking that the user actually provided the gesture that affected the scrollbar. For example, the automated assistant can communicate with an operating system of the computing device in order to indicate to the operating system that the user is intending to manipulate the single GUI element. Information provided to the operating system by the automated assistant can be based on the gesture data generated by the automated assistant. Therefore, in some implementations, the operating system can communicate with the application on behalf of the automated assistant in order to control the application as if the user provided the gesture characterized by the element data.

Figure 4:
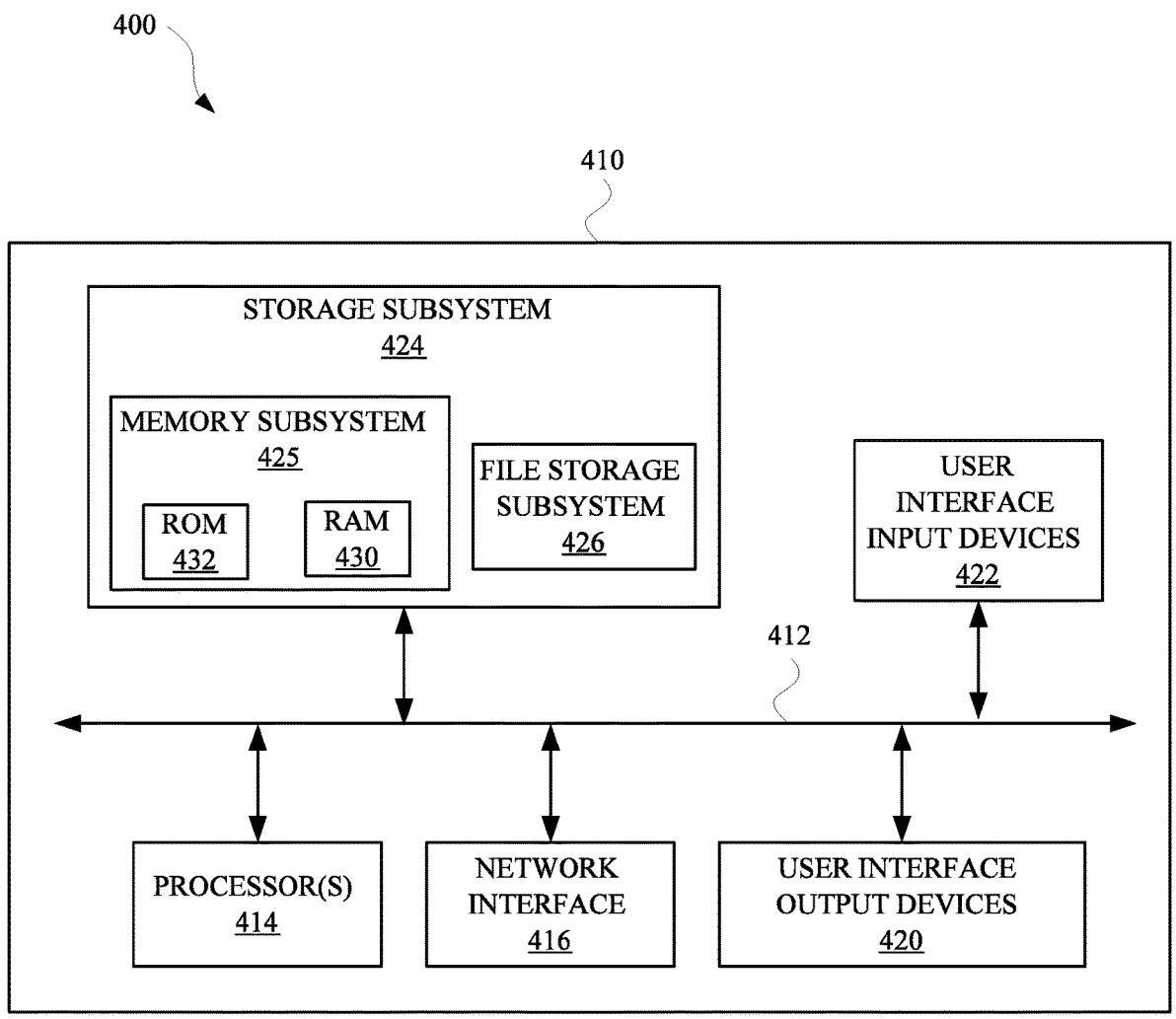
FIG. 4 is a block diagram of an example computer system.

FIG. 4 is a block diagram of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 104, automated assistant 130, and/or any other application, device, apparatus, and/or module discussed herein.

These software modules are generally executed by processor 414 alone or in combination with other processors.

Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining that a user has provided a spoken utterance to a computing device, wherein the spoken utterance is provided while an application graphical user interface (GUI) is being rendered at a display panel of the computing device, and wherein the computing device provides access to an automated assistant that is controllable via spoken natural language inputs. The method can further include an operation of identifying, based on receiving the spoken utterance, content description data provided by an application that is rendering the application GUI at the display panel, wherein the content description data is omitted from the application GUI but characterizes one or more GUI elements that are: being rendered at the application GUI and capable of being interacted with by the user via one or more input gestures to provide an input to the application. The method can further include an operation of determining, based on the content description data and the spoken utterance, whether natural language content of the spoken utterance corresponds to at least one GUI element of the one or more GUI elements characterized by the content description data. The method can further include an operation of, when the natural language content corresponds to a particular GUI element of the at least one GUI element: generating, based on the natural language content corresponding to the particular GUI element, input data that is in accordance with the natural language content of the spoken utterance.

In some implementations, the method can further include an operation of, when the natural language content corresponds to the particular GUI element of the at least one GUI element: causing the input data to be rendered at or near the particular GUI element of the application GUI. In some implementations, the method can further include an operation of, when the natural language content corresponds to the particular GUI element of the at least one GUI element: causing the input data to be transmitted to the application or a separate computing device that is different from the computing device. In some implementations, the method can further include an operation of, when the natural language content corresponds to multiple different GUI elements of the at least one GUI element: causing the display panel of the computing device to render a graphical indicator at or near each GUI element of the multiple different GUI elements.

In some implementations, the method can further include an operation of, when the natural language content corresponds to multiple different GUI elements of the at least one GUI element: determining that the user has provided a subsequent spoken utterance that includes natural language content specifying an intended GUI element to control from the multiple different GUI elements, and causing, based on determining that the user has provided the subsequent spoken utterance, the application to initialize another action corresponding to the intended GUI element. In some implementations, the application is provided by a third party entity that is different from an entity that provided the automated assistant. In some implementations, the other natural language content of the subsequent spoken utterance is void of one or more words that identify the automated assistant. In some implementations, the method can include, when the natural language content does not correspond to a particular GUI element of the at least one GUI element: refraining from generating the input data.

In some implementations, the method can further include an operation of, when the natural language content corresponds to the particular GUI element of the at least one GUI element: identifying, by the automated assistant, an application action that corresponds to the particular GUI element, and causing the application action to be initialized by the application, wherein generating the input data is further performed in accordance with the application action. In some implementations, the application action includes causing a menu having multiple menu elements to be rendered at the application GUI, and the element data characterizes each menu element of the multiple menu elements. In some implementations, the method can further include an operation of, when the natural language content corresponds to the particular GUI element of the at least one GUI element: determining, subsequent to causing the application action to be initialized and the menu to be rendered at the application GUI, that the user has provided a subsequent spoken utterance that: explicitly identifies a particular menu element of the multiple menu elements and is void of one or more words that identify the automated assistant, and causing, based on determining that the user has provided the subsequent spoken utterance, a corresponding action to be initialized by the application based on the particular menu element being identified.

In other implementations, a method implemented by one or more processors is set forth as including operations such as determining, by an automated assistant that is accessible via a computing device, that a user has provided a spoken utterance to the automated assistant, wherein the spoken utterance is provided while an application graphical user interface (GUI) is being rendered at a display panel of the computing device, and wherein the spoken utterance includes natural language content that identifies the automated assistant. In some implementations, the method can further include an operation of identifying, based on receiving the spoken utterance, content description data provided by an application that is rendering the application GUI at the display panel, wherein the content description data is omitted from the application GUI but characterizes one or more GUI elements that are: being rendered at the application GUI and capable of being interacted with by the user via one or more input gestures to provide an input to the application. In some implementations, the method can further include an operation of determining, based on the content description data and the spoken utterance, whether natural language content of the spoken utterance corresponds to at least one GUI element of the one or more GUI elements characterized by the content description data. In some implementations, the method can further include an operation of, when the natural language content corresponds to a particular GUI element of the at least one GUI element: causing the automated assistant to operate according to a GUI control mode in which a subsequent spoken utterance provided by the user can omit one or more words that identify the automated assistant but can nonetheless cause the automated assistant to initialize performance of an application action, and generating, based on the natural language content corresponding to the particular GUI element, input data that is in accordance with the natural language content of the spoken utterance. In some implementations, the method can further include, when the natural language content does not correspond to a particular GUI element of the at least one GUI element: causing the automated assistant to not operate according to the GUI control mode, and refraining from generating the input data.

In some implementations, the content description data includes other natural language content, wherein determining whether the natural language content of the spoken utterance corresponds to the at least one GUI element includes: determining that at least a portion of the natural language content of the spoken utterance is included in the other natural language content of the content description data that is omitted from the application GUI. In some implementations, when the natural language content corresponds to a particular GUI element of the at least one GUI element and the automated assistant is operating according to the GUI control mode: determining that an additional spoken utterance has been provided as input to the computing device from the user, wherein the additional spoken utterance is void of one or more words that identify the automated assistant, and generating, based on additional natural language content of the additional spoken utterance, additional input data that is in accordance with the additional natural language content of the spoken utterance.

In some implementations, the additional natural language content of the additional spoken utterance identifies a location of another GUI element relative to the particular GUI element. In some implementations, the additional natural language content of the additional spoken utterance characterizes at least one of an input gesture of the one or more input gestures and another GUI element.

In yet other implementations, a method implemented by one or more processors is set forth as including operations such as determining, by an automated assistant that is accessible via a computing device, that a user has provided a spoken utterance to the automated assistant, wherein the spoken utterance is provided while an application graphical user interface (GUI) of an application is being rendered at a display panel of the computing device, and wherein the spoken utterance includes natural language content that identifies the automated assistant. In some implementations, the method can further include an operation of determining, based on the spoken utterance, whether natural language content of the spoken utterance corresponds to multiple different GUI elements rendered with the application GUI, wherein a total number of user-controllable GUI elements rendered with the application GUI is greater than a total of the multiple different GUI elements to which the natural language content is determine to correspond. In some implementations, the method can further include an operation of causing, based on determining that the natural language content corresponds to multiple different GUI elements, multiple different graphical indicators to be rendered at or near the multiple different GUI element, wherein each graphical indicator of the multiple different graphical indicators is rendered to correspond to a GUI element of the multiple different GUI elements. In some implementations, the method can further include an operation of determining, by the automated assistant, that the user has provided a subsequent spoken utterance to the automated assistant, wherein the subsequent spoken utterance is provided concurrent to the multiple different graphical indicators being rendered at or near the multiple different GUI elements. In some implementations, the method can further include an operation of determining, based on other natural language content of the subsequent spoken utterance, that the user has identified a particular GUI element that is associated with a corresponding graphical indicator. In some implementations, the method can further include an operation of generating, based on the natural language content and the other natural language content, input data in furtherance of initializing one or more actions that are in accordance with the natural language content and the other natural language content.

In some implementations, the input data is associated with a gesture input that, when performed by the user, causes the application to initialize an action, and the method further comprises: providing the input data to the application, wherein the input data, when received by the application, causes the application to initialize the action. In some implementations, the natural language content of the spoken utterance is void of one or more words that identify the automated assistant. In some implementations, the other natural language content of the other spoken utterance identifies a location of the particular GUI element within the application GUI. In some implementations, the other natural language content of the additional spoken utterance identifies information that is omitted from the particular GUI element within the application GUI but is stored in association with the particular GUI element as content description data.

We claim:

1. A method implemented by one or more processors, the method comprising:
   determining that a user has provided a spoken utterance to a computing device,
      wherein the spoken utterance is provided while an application graphical user interface (GUI) is being rendered at a display panel of the computing device, and
      wherein the computing device provides access to an automated assistant that is controllable via spoken natural language inputs;
   identifying, based on receiving the spoken utterance, content description data provided by an application that is rendering the application GUI at the display panel,
      wherein the content description data is omitted from the application GUI but characterizes one or more GUI elements that are: being rendered at the application GUI and capable of being interacted with by the user via one or more input gestures to provide an input to the application;
   determining, based on comparing the content description data and the spoken utterance, whether natural language content of the spoken utterance corresponds to at least one GUI element of the one or more GUI elements characterized by the content description data; and
   when the natural language content corresponds to a particular GUI element of the at least one GUI element:
      generating, based on the natural language content corresponding to the particular GUI element, input data that is in accordance with the natural language content of the spoken utterance.

2. The method of claim 1, further comprising:
   when the natural language content corresponds to the particular GUI element of the at least one GUI element:
      causing the input data to be rendered at or near the particular GUI element of the application GUI.

3. The method as in claim 1, further comprising:
   when the natural language content corresponds to the particular GUI element of the at least one GUI element:
      causing the input data to be transmitted to the application or a separate computing device that is different from the computing device.

4. The method of claim 1, further comprising:
   when the natural language content corresponds to multiple different GUI elements of the at least one GUI element:
      causing the display panel of the computing device to render a graphical indicator at or near each GUI element of the multiple different GUI elements.

5. The method of claim 4, further comprising:
   when the natural language content corresponds to multiple different GUI elements of the at least one GUI element:
      determining that the user has provided a subsequent spoken utterance that includes natural language content specifying an intended GUI element to control from the multiple different GUI elements, and
      causing, based on determining that the user has provided the subsequent spoken utterance, the application to initialize another action corresponding to the intended GUI element.

6. The method of claim 1, wherein the application is provided by a third party entity that is different from an entity that provided the automated assistant.

7. The method of claim 1, wherein the natural language content of the spoken utterance is void of one or more words that identify the automated assistant.

8. The method of claim 1, further comprising:
   when the natural language content corresponds to the particular GUI element of the at least one GUI element:
      identifying, by the automated assistant, an application action that corresponds to the particular GUI element, and
      causing the application action to be initialized by the application, wherein generating the input data is further performed in accordance with the application action.

9. The method of claim 8,
   wherein the application action includes causing a menu having multiple menu elements to be rendered at the application GUI.

10. The method of claim 9, further comprising:
    when the natural language content corresponds to the particular GUI element of the at least one GUI element:
       determining, subsequent to causing the application action to be initialized and the menu to be rendered at the application GUI, that the user has provided a subsequent spoken utterance that: explicitly identifies a particular menu element of the multiple menu elements and is void of one or more words that identify the automated assistant, and
       causing, based on determining that the user has provided the subsequent spoken utterance, a corresponding action to be initialized by the application based on the particular menu element being identified.

11. The method of claim 1, further comprising:
    when the natural language content does not correspond to the particular GUI element of the at least one GUI element:
       refraining from generating the input data.

12. A method implemented by one or more processors, the method comprising:
    determining, by an automated assistant that is accessible via a computing device, that a user has provided a spoken utterance to the automated assistant,
       wherein the spoken utterance is provided while an application graphical user interface (GUI) is being rendered at a display panel of the computing device, and wherein the spoken utterance includes natural language content that identifies the automated assistant;

identifying, based on receiving the spoken utterance, content description data provided by an application that is rendering the application GUI at the display panel, wherein the content description data is omitted from the application GUI but characterizes one or more GUI elements that are: being rendered at the application GUI and capable of being interacted with by the user via one or more input gestures to provide an input to the application;

determining, based on the content description data and the spoken utterance, whether the natural language content of the spoken utterance corresponds to at least one GUI element of the one or more GUI elements characterized by the content description data; and in response to determining that the natural language content corresponds to a particular GUI element of the at least one GUI element:
  causing the automated assistant to operate according to a GUI control mode in which a subsequent spoken utterance provided by the user can omit one or more words that identify the automated assistant but can nonetheless cause the automated assistant to initialize performance of an application action via one or more of the GUI elements rendered at the display panel, and
  generating, based on the natural language content corresponding to the particular GUI element, input data that is directed to the particular GUI element and that is in accordance with the natural language content of the spoken utterance.

13. The method of claim 12, wherein the content description data includes other natural language content, wherein determining whether the natural language content of the spoken utterance corresponds to the at least one GUI element includes:
  determining that at least a portion of the natural language content of the spoken utterance is included in the other natural language content of the content description data that is omitted from the application GUI.

14. The method of claim 12, further comprising:
  when the natural language content corresponds to the particular GUI element of the at least one GUI element and the automated assistant is operating according to the GUI control mode:
    determining that an additional spoken utterance has been provided as input to the computing device from the user, wherein the additional spoken utterance is void of one or more words that identify the automated assistant, and
    generating, based on additional natural language content of the additional spoken utterance, additional input data that is in accordance with the additional natural language content of the spoken utterance.

15. The method of claim 14, wherein the additional natural language content of the additional spoken utterance identifies a location of another GUI element relative to the particular GUI element.

16. The method of claim 14, wherein the additional natural language content of the additional spoken utterance characterizes at least one of an input gesture of the one or more input gestures and another GUI element.

17. The method of claim 12, further comprising: when the natural language content does not correspond to the particular GUI element of the at least one GUI element: causing the automated assistant to not operate according to the GUI control mode, and refraining from generating the input data.

18. A method implemented by one or more processors, the method comprising:
  determining, by an automated assistant that is accessible via a computing device, that a user has provided a spoken utterance to the automated assistant,
    wherein the spoken utterance is provided while an application graphical user interface (GUI) of an application is being rendered at a display panel of the computing device, and
    wherein the spoken utterance includes natural language content that identifies the automated assistant;
  determining, based on the spoken utterance, whether natural language content of the spoken utterance corresponds to multiple different GUI elements rendered with the application GUI,
    wherein a total number of user-controllable GUI elements rendered with the application GUI is greater than a total of the multiple different GUI elements to which the natural language content is determined to correspond;
  causing, based on determining that the natural language content corresponds to multiple different GUI elements, multiple different graphical indicators to be rendered at or near the multiple different GUI elements,
    wherein each graphical indicator of the multiple different graphical indicators is rendered to correspond to a GUI element of the multiple different GUI elements;
  determining, by the automated assistant, that the user has provided a subsequent spoken utterance to the automated assistant,
    wherein the subsequent spoken utterance is provided while the multiple different graphical indicators are being rendered at or near the multiple different GUI elements;
  determining, based on comparing other natural language content of the subsequent spoken utterance to additional content description data that characterizes respective visual features of the multiple different graphical indicators, that the user has identified a particular graphical indicator of the multiple different graphical indicators;
  in response to determining that the user has selected the particular graphical indicator, determining that the user has selected a particular GUI element that is associated with the particular graphical indicator; and
  generating, based on the natural language content and selecting the particular GUI element, input data in furtherance of initializing one or more actions that are in accordance with the natural language content and that are associated with the particular GUI element.

19. The method of claim 18, wherein the input data is associated with a gesture input that, when performed by the user, causes the application to initialize an action, and the method further comprises:
  providing the input data to the application, wherein the input data, when received by the application, causes the application to initialize the action.

20. The method of claim 18, wherein the other natural language content of the subsequent spoken utterance is void of one or more words that identify the automated assistant.

* * * * *